(12) United States Patent
Nory et al.

(10) Patent No.: US 12,302,343 B2
(45) Date of Patent: May 13, 2025

(54) L1 SIGNALING FOR SCELL DORMANCY INDICATION

(71) Applicant: Telefonaktiebolaget LM Ericsson (publ), Stockholm (SE)

(72) Inventors: Ravikiran Nory, San José, CA (US); Ajit Nimbalker, Dublin, CA (US)

(73) Assignee: Telefonaktiebolaget LM Ericsson (PUBL) (SE)

( * ) Notice: Subject to any disclaimer, the term of this patent is extended or adjusted under 35 U.S.C. 154(b) by 314 days.

(21) Appl. No.: 17/774,734

(22) PCT Filed: Nov. 6, 2020

(86) PCT No.: PCT/SE2020/051068
§ 371 (c)(1),
(2) Date: May 5, 2022

(87) PCT Pub. No.: WO2021/091467
PCT Pub. Date: May 14, 2021

(65) Prior Publication Data
US 2022/0394682 A1  Dec. 8, 2022

Related U.S. Application Data

(60) Provisional application No. 62/933,172, filed on Nov. 8, 2019.

(51) Int. Cl.
*H04W 72/23* (2023.01)
*H04L 1/00* (2006.01)
(Continued)

(52) U.S. Cl.
CPC ........... *H04W 72/23* (2023.01); *H04L 1/0004* (2013.01); *H04L 27/26025* (2021.01); *H04W 72/0453* (2013.01)

(58) Field of Classification Search
CPC ............ H04W 72/23; H04W 72/0453; H04W 52/0229; H04W 52/0216; H04W 76/28;
(Continued)

(56) References Cited

U.S. PATENT DOCUMENTS 9,642,121 B2 * 5/2017 Song ..................... H04L 5/0069
10,791,512 B2 * 9/2020 Kadiri ............... H04W 52/0206
(Continued)

OTHER PUBLICATIONS

3GPP TS 38.331 V15.7.0; 3rd Generation Partnership Project; Technical Specification Group Radio Access Network; NR; Radio Resource Control (RRC) protocol specification (Release 15); Sep. 2019; consisting of 527 pages.
(Continued)

*Primary Examiner* — Brian T O Connor
(74) *Attorney, Agent, or Firm* — Weisberg I.P. Law, P.A.

(57) ABSTRACT

A method, system and apparatus are disclosed. According to one or more embodiments, a wireless device configured to communicate with a network node is provided. The wireless device includes processing circuitry configured to: receive downlink control information, DCI, from a primary cell, Pcell; determine that at least one bitfield in the DCI indicates a secondary cell Scell, dormancy; and cause the wireless device to transition the Scell from one of to and from a dormant state based on the at least one bitfield, a timing of the transition being based on a numerology of at least one of the Pcell and Scell.

20 Claims, 10 Drawing Sheets

(51) Int. Cl.
*H04L 27/26* (2006.01)
*H04W 72/0453* (2023.01)

(58) Field of Classification Search
CPC .... H04W 76/20; H04W 76/27; H04L 1/0004; H04L 27/26025; H04L 5/0007; H04L 5/0035; H04L 5/0053; H04L 5/0096; Y02D 30/70
See application file for complete search history.

(56) References Cited

U.S. PATENT DOCUMENTS

| | | | | |
|---|---|---|---|---|
| 11,019,674 B2* | 5/2021 | Hong | | H04W 76/27 |
| 11,212,747 B2* | 12/2021 | Zhou | | H04W 76/15 |
| 11,606,835 B2* | 3/2023 | Hong | | H04W 76/27 |
| 11,792,874 B2* | 10/2023 | Tsai | | H04W 76/27 |
| | | | | 370/329 |
| 11,950,186 B2* | 4/2024 | Ma | | H04W 76/28 |
| 2015/0215929 A1 | 7/2015 | Damnjanovic et al. | | |
| 2019/0021052 A1* | 1/2019 | Kadiri | | H04L 5/0098 |
| 2022/0078707 A1* | 3/2022 | Zhou | | H04W 76/28 |
| 2022/0303899 A1* | 9/2022 | Ma | | H04W 24/08 |
| 2023/0413374 A1* | 12/2023 | Tsai | | H04W 74/0833 |

OTHER PUBLICATIONS

International Search Report and Written Opinion dated Feb. 1, 2021 for International Application No. PCT/SE2020/051068 filed Nov. 6, 2020; consisting of 12 pages.
3GPP TSG RAN WG1 Meeting #98bis R1-1911737; Title: RAN1 agreements for Multi-RAT Dual-Connectivity and Carrier Aggregation enhancements (LTE, NR); Agenda Item: 7.2.13; Source: Nokia, Nokia Shanghai Bell; Document for: Discussion; Date and Location: Oct. 14-20, 2019, Chongqing, P.R. China; consisting of 16 pages.

* cited by examiner

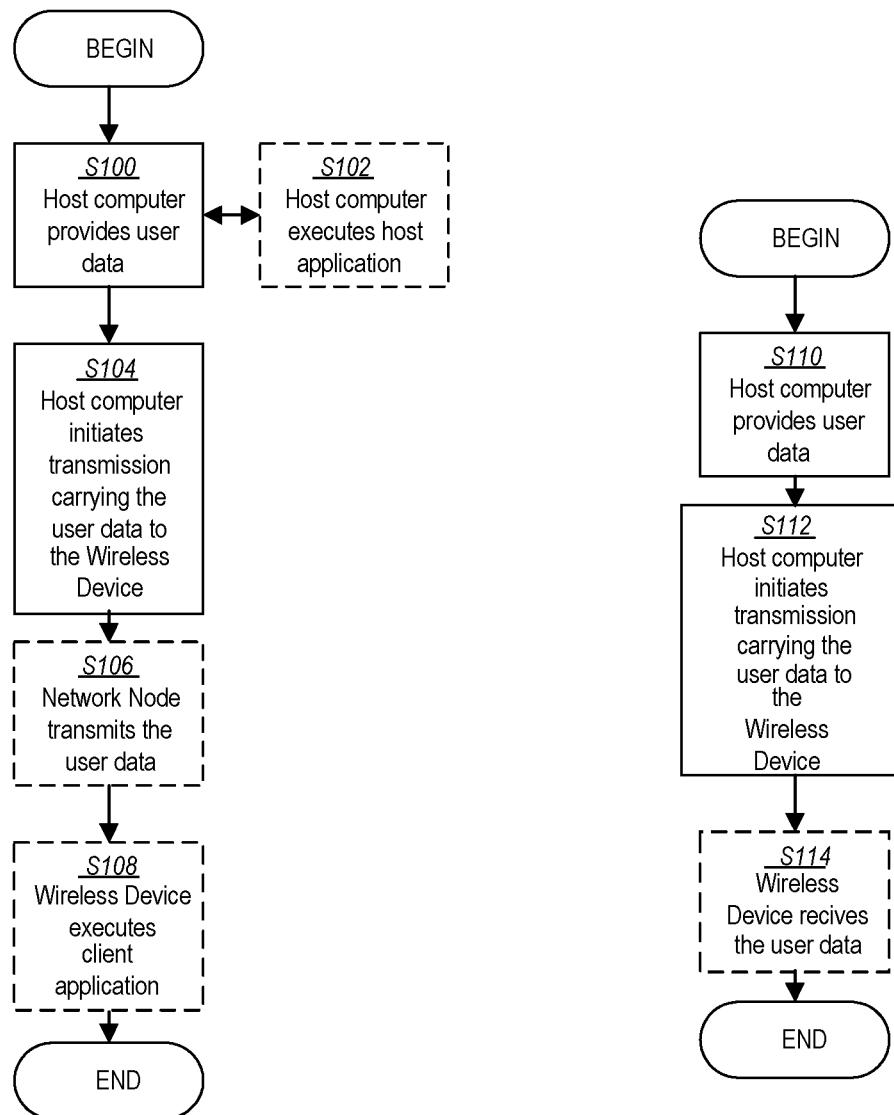

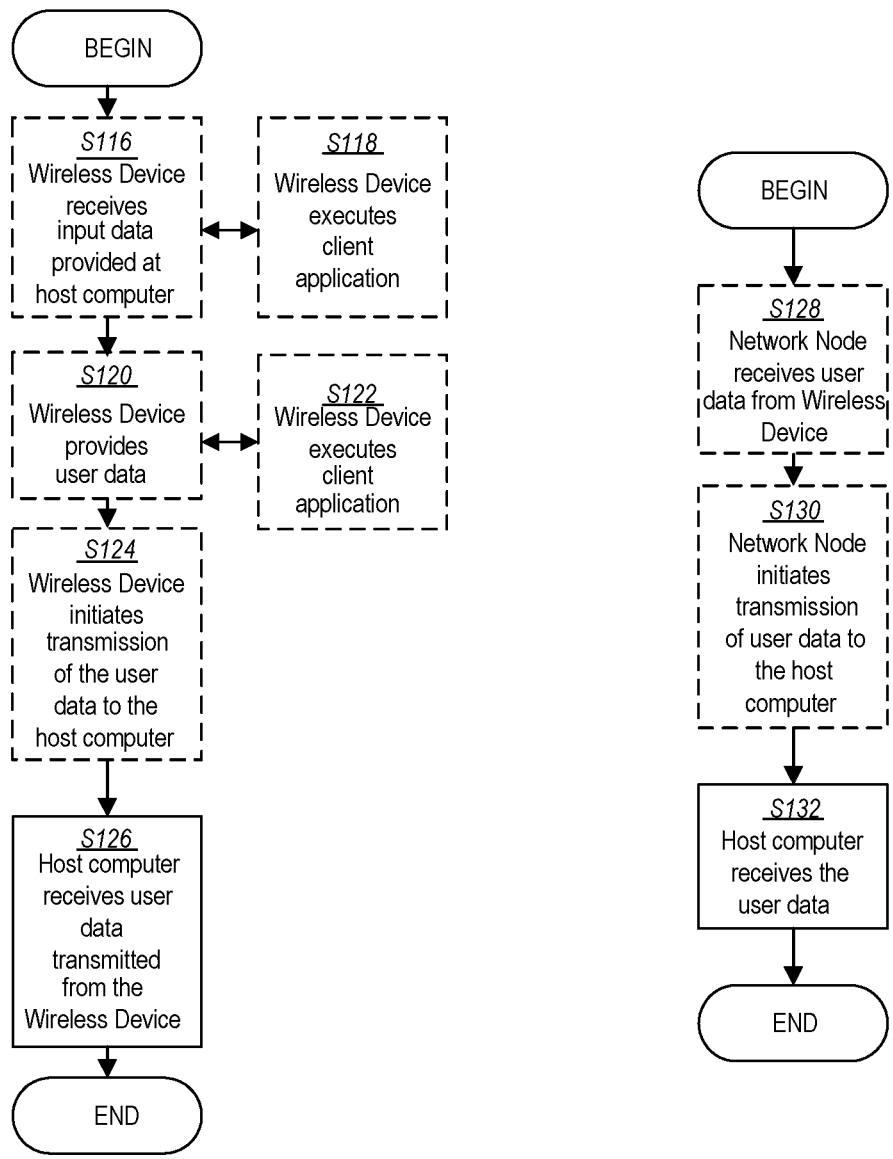

L1 SIGNALING FOR SCELL DORMANCY INDICATION

CROSS-REFERENCE TO RELATED APPLICATIONS

This application is a Submission Under 35 U.S.C. § 371 for U.S. National Stage Patent Application of International Application No.: PCT/SE2020/051068, filed Nov. 6, 2020 entitled "L1 SIGNALING FOR SCELL DORMANCY INDICATION," which claims priority to U. S. Provisional Application No.: 62/933,172, filed Nov. 8, 2019, entitled "L1 SIGNALING FOR SCELL DORMANCY INDICATION," the entireties of both of which are incorporated herein by reference.

TECHNICAL FIELD

The present disclosure relates to wireless communications, and in particular, to OSI layer 1 (L1) signaling indicating a transition of at least one secondary cell, Scell, one of to and from a dormant state such as a dormant bandwidth part (BWP).

BACKGROUND

Carrier Aggregation

Carrier Aggregation is generally used in $3^{rd}$ Generation Partnership Project (3GPP) New Radio (NR, also referred to as $5^{th}$ Generation (5G)) and 3GPP Long Term Evolution (LTE, also referred to as $4^{th}$ Generation) systems to improve wireless device transmit/receive data rate. With carrier aggregation (CA), the wireless device typically operates initially on single serving cell called a primary cell (Pcell). The Pcell is operated on a component carrier in a frequency band. The wireless device is then configured by the network with one or more secondary serving cells (Scell(s)). Each Scell can correspond to a component carrier (CC) in the same frequency band (intra-band CA) or different frequency band (inter-band CA) from the frequency band of the CC corresponding to the Pcell. For the wireless device to transmit/receive data on the Scell(s) (e.g., by receiving DL-SCH information on a PDSCH or by transmitting UL-SCH on a PUSCH), the Scell(s) need to be activated by the network. The Scell(s) can also be deactivated and later reactivated as needed via activation/deactivation signaling.

Scell Activation/Deactivation in NR Rel15

FIG. 1 is a diagram of Scell activation/deactivation related procedures specified for wireless communication standards such as Third Generation Partnership Projection (3GPP) Release 15 (Rel15) NR. As shown FIG. 1, except for Channel State Information (CSI) reporting, the wireless device 22 is allowed to start performing other 'activation related actions' (e.g., PDCCH monitoring for Scell, PUCCH/SRS transmission on the Scell, etc.) within a specified range of slots. i.e., after the minimum required activation delay (as specified in wireless communication standards such as in 3GPP TS 38.213) and before the maximum allowed activation delay (as specified in wireless communication standards such as in 3GPP TS 38.133). CSI reporting for the Scell starts (and stops) with a fixed slot offset after receiving the activation (deactivation) command.

Below a minimum required activation delay and maximum allowed activation delay for some example conditions are described.

Minimum required activation delay is k1+3 ms+1 slots as specified in wireless communication standards such as in 3GPP TS 38.213 sub clause 4.3. Assuming 30 kHz numerology for Pcell, and k1=4, this would be 5.5 ms.

Maximum allowed activation delay depends on conditions described in wireless communication standards such as in 3GPP TS 38.133 sub clause 8.3.2 and the value varies based on wireless device measurement configuration, operating frequency range and other aspects.

Assuming T_HARQ as described in wireless communication standards such as in 3GPP TS 38.133 has similar meaning as k1 as described in wireless communication standards such as in 3GPP TS 38.213, and assuming 'known Scell' with Scell measurement cycle is equal to or smaller than [160 ms], and T_csi_reporting=4slots For FR1 and 30 kHz SCS,
If SMTC periodicity 5 ms, the delay cannot be larger than (T_HARQ=4slots)+(T_act_time=5 ms+5 ms)+(T_csi_report=4slots)=14 ms;
SMTC periodicity 20 ms, the delay cannot be larger than (T_HARQ=4slots)+(T_act_time=5 ms+20 ms)+(T_csi_report=4slots)=29 ms.

For FR2, assuming this is the first Scell being activated in that FR2 band,
SMTC periodicity 5 ms, the delay is 4slots+5 ms+TBD*5 ms+4slots=6 ms+X*5 ms;
SMTC periodicity 20 ms, the delay is 4slots+5 ms+TBD*20 ms+4slots=6 ms+X*20 ms
X>1 is to be determined in such as in Rel15 specification.

For other conditions, e.g., Scell is not 'known' and longer SMTC periodicities, the maximum allowed activation delay is much longer than the values in the above example.

BWPs

In 3GPP NR, a subset of the total cell bandwidth of a cell is referred to as a Bandwidth Part (BWP) and bandwidth adaptation is achieved by configuring the wireless device with BWP(s) and informing the wireless device which of the configured BWPs is currently the active one.

FIG. 2 is a diagram that illustrates an example of a scenario where 3 different BWPs are configured:
$BWP_1$ with a width of 40 MHz and subcarrier spacing of 15 kHz;
$BWP_2$ with a width of 10 MHz and subcarrier spacing of 15 kHz;
$BWP_3$ with a width of 20 MHz and subcarrier spacing of 60 kHz.

In NR, two options for configuring BWP#0 (initial BWP) are specified (i.e., Option 1 and Option 2 described in wireless communication standards such as in Annex B.2 of 3GPP TS 38.331). When the BWP configuration includes wireless device-specific information (e.g., IEs like Serving-Cellconfig) that BWP can be considered as a wireless device-specific RRC configured BWP.

FIG. 3 is a diagram of an example of a BWP#0 configuration without dedicated configuration (Option 1). FIG. 4 is a diagram of an example of a BWP#0 configuration with dedicated configuration (Option 2).

However, signaling for transition to/from dormancy-like behavior on SCells has not yet be defined in existing standards.

SUMMARY

The present disclosure helps solves problems with existing systems by providing an L1 based indication on a Pcell to indicate transition to/from dormancy-like behavior on Scells that need to be provided, for at least NR Release 16. The present disclosure describes details of the L1 based signaling.

Some embodiments advantageously provide methods, systems, and apparatuses for open systems interconnection (OSI) layer 1 (referred to generally herein as "L1") signaling indicating a transition of at least one secondary cell, Scell, one of to and from a dormant state such as a dormant bandwidth part (BWP).

The present disclosure provides mechanisms for efficient and flexible L1 signaling for transition Scells to/from dormancy. For example, in one or more embodiments, a mechanism is provided where a wireless device determines bitfields of a PDCCH DCI format received on a primary cell based on whether or not a dormant BWP is configured for at least one secondary serving cell (Scell). In one or more embodiments, a mechanism is provided where if the wireless device is configured with at least one dormant BWP, and if a first bitfield in a DCI format is set to a first value, the wireless device assumes that a) a first set of bitfields in the DCI format are not present, b) a second set of other bitfields in the DCI format are present, and c) a Scell dormancy indication bitfield of a first length is present; otherwise, the wireless device assumes that a) both first and second set of bitfields are present and b) a Scell dormancy indication bitfield of the first length is not present.

Hence, the teachings in the present disclosure provide mechanisms to enable efficient and flexible indication of Scell dormancy.

According to one aspect of the disclosure, a wireless device configured to communicate with a network node is provided. The wireless device includes processing circuitry configured to: receive downlink control information, DCI, from a primary cell, Pcell; determine that at least one bitfield in the DCI indicates a secondary cell Scell, dormancy; and cause the wireless device to transition the Scell from one of to and from a dormant state based on the at least one bitfield, a timing of the transition being based on a numerology of at least one of the Pcell and Scell.

According to one or more embodiments, the at least one bitfield in the DCI is one of: set to a first value to indicate to transition to the dormant state; and set to a second value to indicate to transition from the dormant state, the first value being different from the second value. According to one or more embodiments, the determining that the at least one bitfield in the DCI indicates the Scell dormancy is based on a first bitfield in the DCI being set to one of: a first value for a type 1 resource allocation; and a second value for a type 0 resource allocation. According to one or more embodiments, the processing circuitry is further configured to interpret the at least one bitfield in the DCI based at least on a value indicated by the first bitfield in the DCI.

According to one or more embodiments, the first bitfield is a frequency domain resource allocation, FDRA, field. According to one or more embodiments, the at least one bitfield in the DCI includes at least one of a modulation and coding scheme bitfield, a new data indicator bitfield, a redundancy version bitfield, Hybrid Automatic Repeat Request, HARQ, process number bitfield, antenna port bitfield and demodulation reference signal, DMRS, sequence initialization bitfield. According to one or more embodiments, the processing circuitry is further configured to determine that the DCI does not schedule a physical downlink shared channel, PDSCH, for the wireless device.

According to one or more embodiments, the transition of one of to and from a dormant state corresponds to one of: a transition from a non-dormant bandwidth part, BWP, to a dormant BWP; and a transition from the dormant BWP to the non-dormant BWP. According to one or more embodiments, a dormant BWP corresponds to a BWP, on the activated Scell, on which physical downlink control channel, PDCCH, monitoring is not performed by the wireless device. According to one or more embodiments, the Scell dormancy indication indicates a plurality of configured Scell groups, each bit in the Scell dormancy indication corresponding to a respective Scell group of the plurality of configured Scell groups.

According to another aspect of the disclosure, a network node configured to communicate with a wireless device is provided. The network node includes processing circuitry configured to cause the network node to: transmit, via a primary cell, Pcell, downlink control information, DCI, including at least one bitfield that indicates a secondary cell, Scell, dormancy, the at least one bitfield configured to at least in part cause the wireless device to transition the Scell from one of to and from a dormant state, a timing of the transition being based on a numerology of at least one of the Pcell and Scell.

According to one or more embodiments, the processing circuitry is further configured to set the at least one bitfield in the DCI to one of: a first value to indicate to transition to the dormant state; and a second value to indicate to transition from the dormant state, the first value being different from the second value. According to one or more embodiments, the at least one bitfield in the DCI indicates Scell dormancy based at least on setting a first bitfield in the DCI to one of: a first value for a type 1 resource allocation; and a second value for a type 0 resource allocation. According to one or more embodiments, the at least one bitfield in the DCI is configured to be interpreted based at least on a value indicated by the first bitfield in the DCI.

According to one or more embodiments, the at least one bitfield in the DCI includes at least one of a modulation and coding scheme bitfield, a new data indicator bitfield, a redundancy version bitfield, Hybrid Automatic Repeat Request, HARQ, process number bitfield, antenna port bitfield and demodulation reference signal, DMRS, sequence initialization bitfield. According to one or more embodiments, the DCI does not schedule a physical downlink shared channel, PDSCH, for the wireless device. According to one or more embodiments, the transition of one of to and from the dormant state corresponds to one of: a transition from a non-dormant bandwidth part, BWP, to a dormant BWP; and a transition from the dormant BWP to the non-dormant BWP.

According to one or more embodiments, a dormant BWP corresponds to a BWP, on the activated Scell, on which physical downlink control channel, PDCCH, monitoring is not performed by the wireless device. According to one or more embodiments, the the Scell dormancy indication indicates a plurality of configured Scell groups, each bit in the Scell dormancy indication corresponding to a respective Scell group of the plurality of configured Scell groups.

According to another aspect of the disclosure, a method for a wireless device that is configured to communicate with a network node is provided. Downlink control information, DCI, is received from a primary cell, Pcell.

A determination is made that at least one bitfield in the DCI indicates a secondary cell Scell, dormancy. The wireless device is caused to transition the Scell from one of to and from a dormant state based on the at least one bitfield, a timing of the transition being based on a numerology of at least one of the Pcell and Scell.

According to one or more embodiments, the at least one bitfield in the DCI is one of: set to a first value to indicate to transition to the dormant state; and set to a second value to indicate to transition from the dormant state, the first value being different from the second value. According to one or more embodiments, the determining that the at least one bitfield in the DCI indicates the Scell dormancy is based on a first bitfield in the DCI being set to one of: a first value for a type 1 resource allocation; and a second value for a type 0 resource allocation. According to one or more embodiments, the at least one bitfield in the DCI is interpreted based at least on a value indicated by the first bitfield in the DCI.

According to one or more embodiments, the first bitfield is a frequency domain resource allocation, FDRA, field. According to one or more embodiments, the at least one bitfield in the DCI includes at least one of a modulation and coding scheme bitfield, a new data indicator bitfield, a redundancy version bitfield, Hybrid Automatic Repeat Request, HARQ, process number bitfield, antenna port bitfield and demodulation reference signal, DMRS, sequence initialization bitfield. According to one or more embodiments, a determination is made that the DCI does not schedule a physical downlink shared channel, PDSCH, for the wireless device.

According to one or more embodiments, the transition of one of to and from a dormant state corresponds to one of: a transition from a non-dormant bandwidth part, BWP, to a dormant BWP; and a transition from the dormant BWP to the non-dormant BWP. According to one or more embodiments, a dormant BWP corresponds to a BWP, on the activated Scell, on which physical downlink control channel, PDCCH, monitoring is not performed by the wireless device. According to one or more embodiments, the Scell dormancy indication indicates a plurality of configured Scell groups, each bit in the Scell dormancy indication corresponding to a respective Scell group of the plurality of configured Scell groups.

According to another aspect of the disclosure, a method for a network node that is configured to communicate with a wireless device is provided. Downlink control information, DCI, including at least one bitfield that indicates a secondary cell, Scell, dormancy is transmitted via a primary cell. The at least one bitfield is configured to at least in part cause the wireless device to transition the Scell from one of to and from a dormant state, a timing of the transition being based on a numerology of at least one of the Pcell and Scell.

According to one or more embodiments, the at least one bitfield in the DCI is set to one of: a first value to indicate to transition to the dormant state; and a second value to indicate to transition from the dormant state, the first value being different from the second value. According to one or more embodiments, the at least one bitfield in the DCI indicates Scell dormancy based at least on setting a first bitfield in the DCI to one of: a first value for a type 1 resource allocation; and a second value for a type 0 resource allocation. According to one or more embodiments, the at least one bitfield in the DCI is configured to be interpreted based at least on a value indicated by the first bitfield in the DCI.

According to one or more embodiments, the at least one bitfield in the DCI includes at least one of a modulation and coding scheme bitfield, a new data indicator bitfield, a redundancy version bitfield, Hybrid Automatic Repeat Request, HARQ, process number bitfield, antenna port bitfield and demodulation reference signal, DMRS, sequence initialization bitfield. According to one or more embodiments, the DCI does not schedule a physical downlink shared channel, PDSCH, for the wireless device. According to one or more embodiments, the transition of one of to and from the dormant state corresponds to one of: a transition from a non-dormant bandwidth part, BWP, to a dormant BWP; and a transition from the dormant BWP to the non-dormant BWP.

According to one or more embodiments, a dormant BWP corresponds to a BWP, on the activated Scell, on which physical downlink control channel, PDCCH, monitoring is not performed by the wireless device. According to one or more embodiments, the Scell dormancy indication indicates a plurality of configured Scell groups, each bit in the Scell dormancy indication corresponding to a respective Scell group of the plurality of configured Scell groups.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a flowchart illustrating example methods implemented in a communication system including a host computer, a network node and a wireless device for executing a client application at a wireless device according to some embodiments of the present disclosure;

FIG. 8 is a flowchart illustrating example methods implemented in a communication system including a host computer, a network node and a wireless device for receiving user data at a wireless device according to some embodiments of the present disclosure;

FIG. 9 is a flowchart illustrating example methods implemented in a communication system including a host computer, a network node and a wireless device for receiving user data from the wireless device at a host computer according to some embodiments of the present disclosure;

FIG. 10 is a flowchart illustrating example methods implemented in a communication system including a host computer, a network node and a wireless device for receiving user data at a host computer according to some embodiments of the present disclosure;

DETAILED DESCRIPTION

Figure 1:
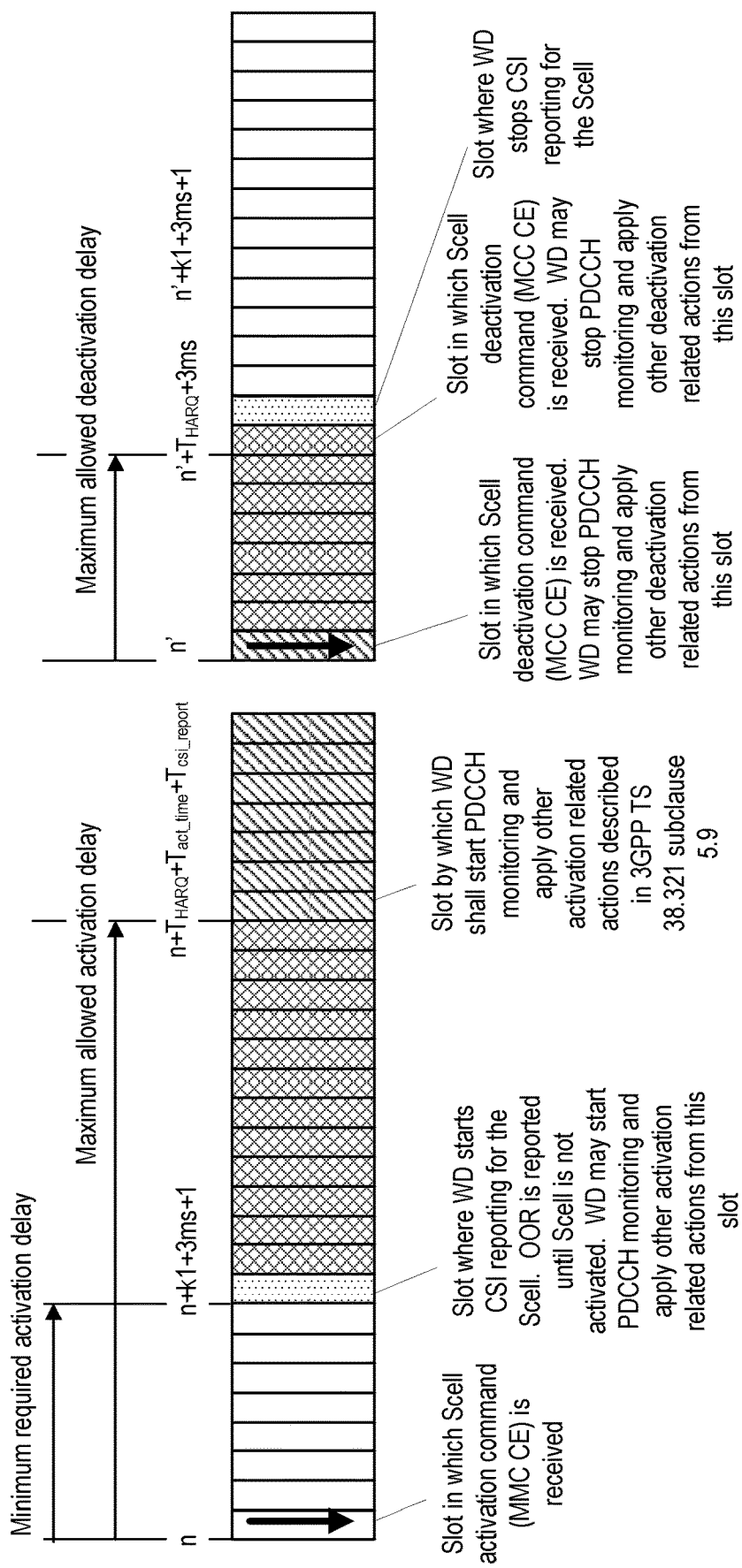
FIG. 1 is a diagram of Scell activation/deactivation in NR release 15.
Figure 2:
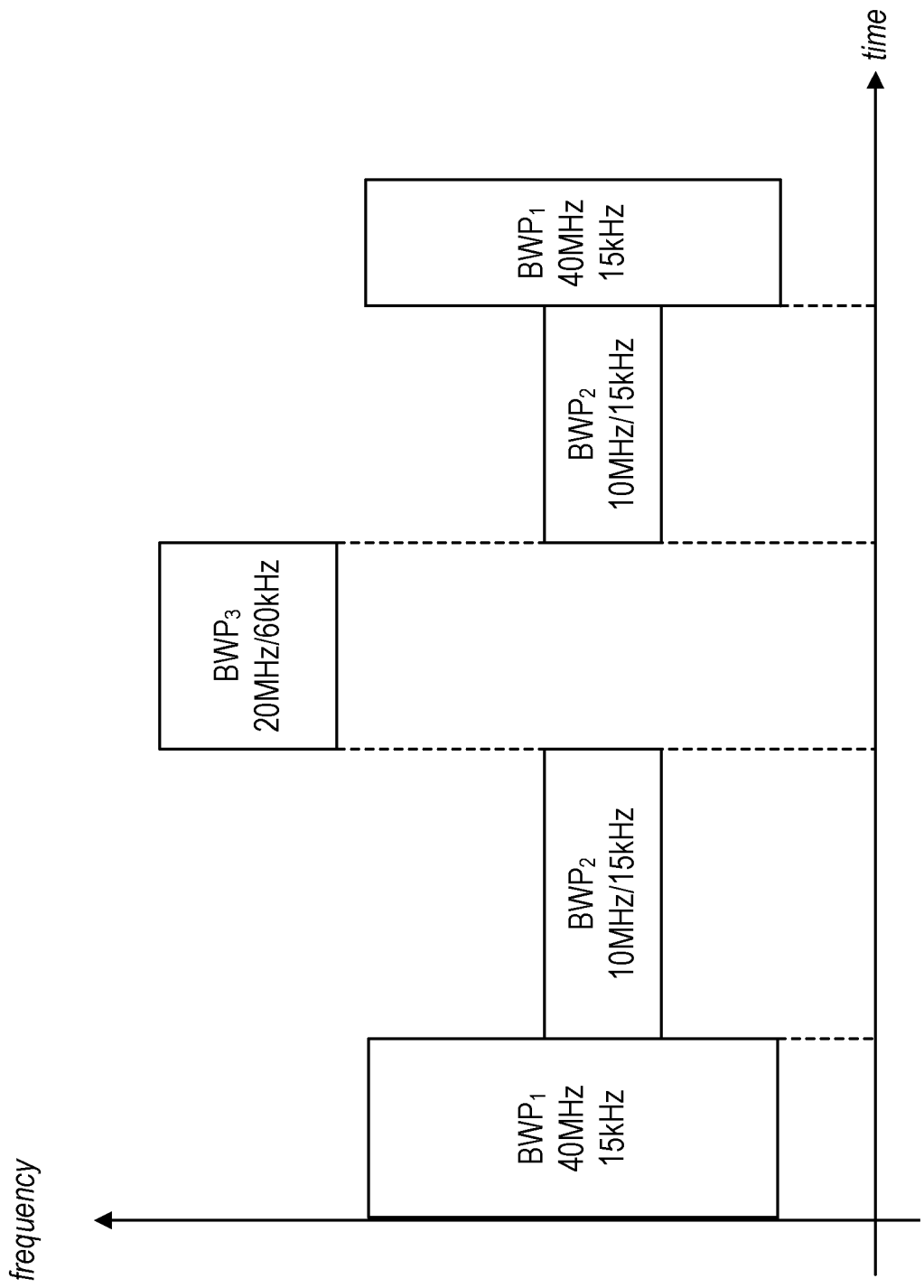
FIG. 2 is a diagram of three different BWPs.
Figure 3:
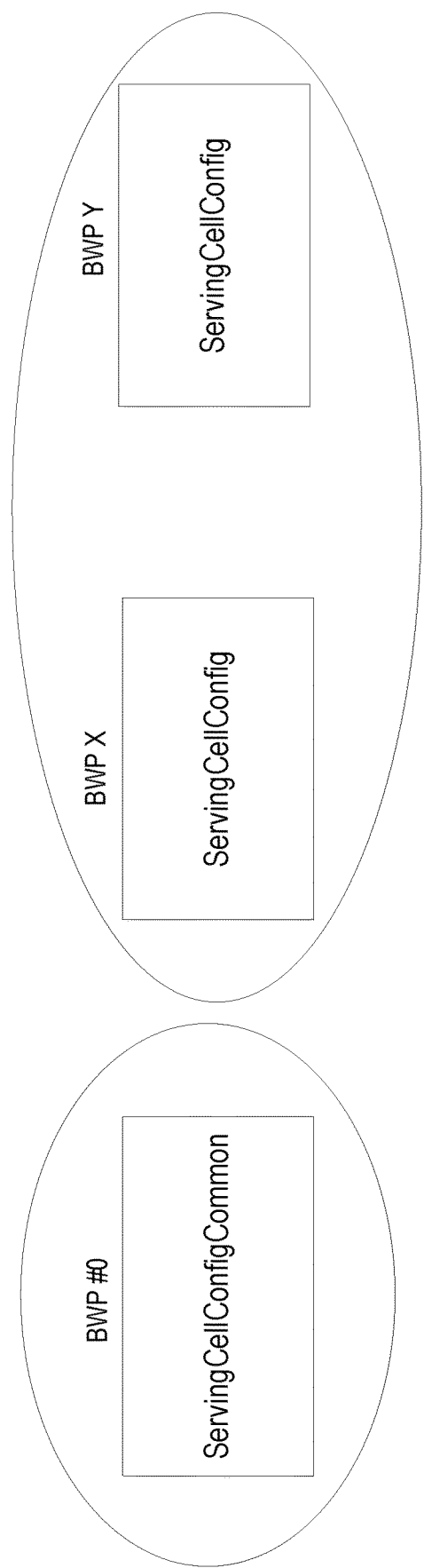
FIG. 3 is a diagram of BWP#0 configuration without dedicated configuration (option 1)
Figure 4:
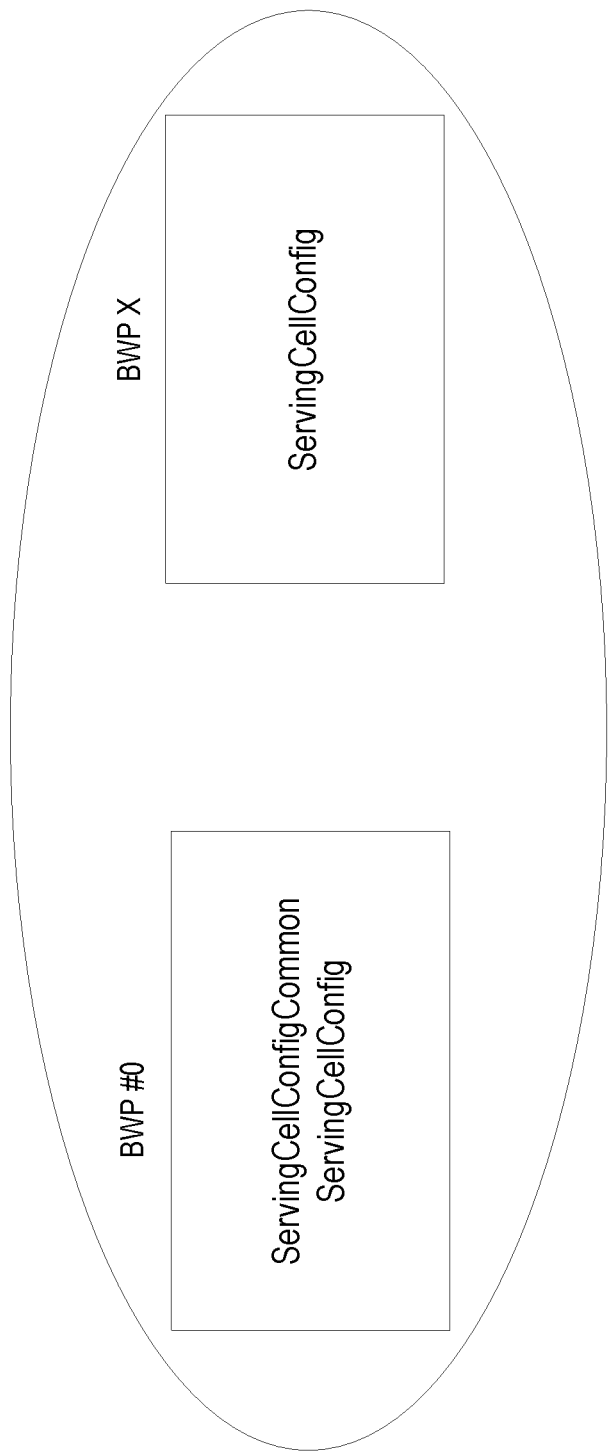
FIG. 4 is diagram of BWP#0 configuration with dedicated configuration (option 2)

Before describing in detail exemplary embodiments, it is noted that the embodiments reside primarily in combinations of apparatus components and processing steps related to layer 1 (L1) signaling indicating a transition of at least one secondary cell, Scell, one of to and from a dormant state such as a dormant bandwidth part (BWP). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

A cell may be generally a communication cell, e.g., of a cellular or mobile communication network, provided by a node. A serving cell may be a cell on or via which a network node (the node providing or associated to the cell, e.g., base station, gNB or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode and/or one or more rules for interpreting L1 signaling. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide layer 1 (L1) signaling indicating a transition of at least one secondary cell, Scell, one of to and from a dormant state such as a dormant bandwidth part (BWP).

Figure 5:
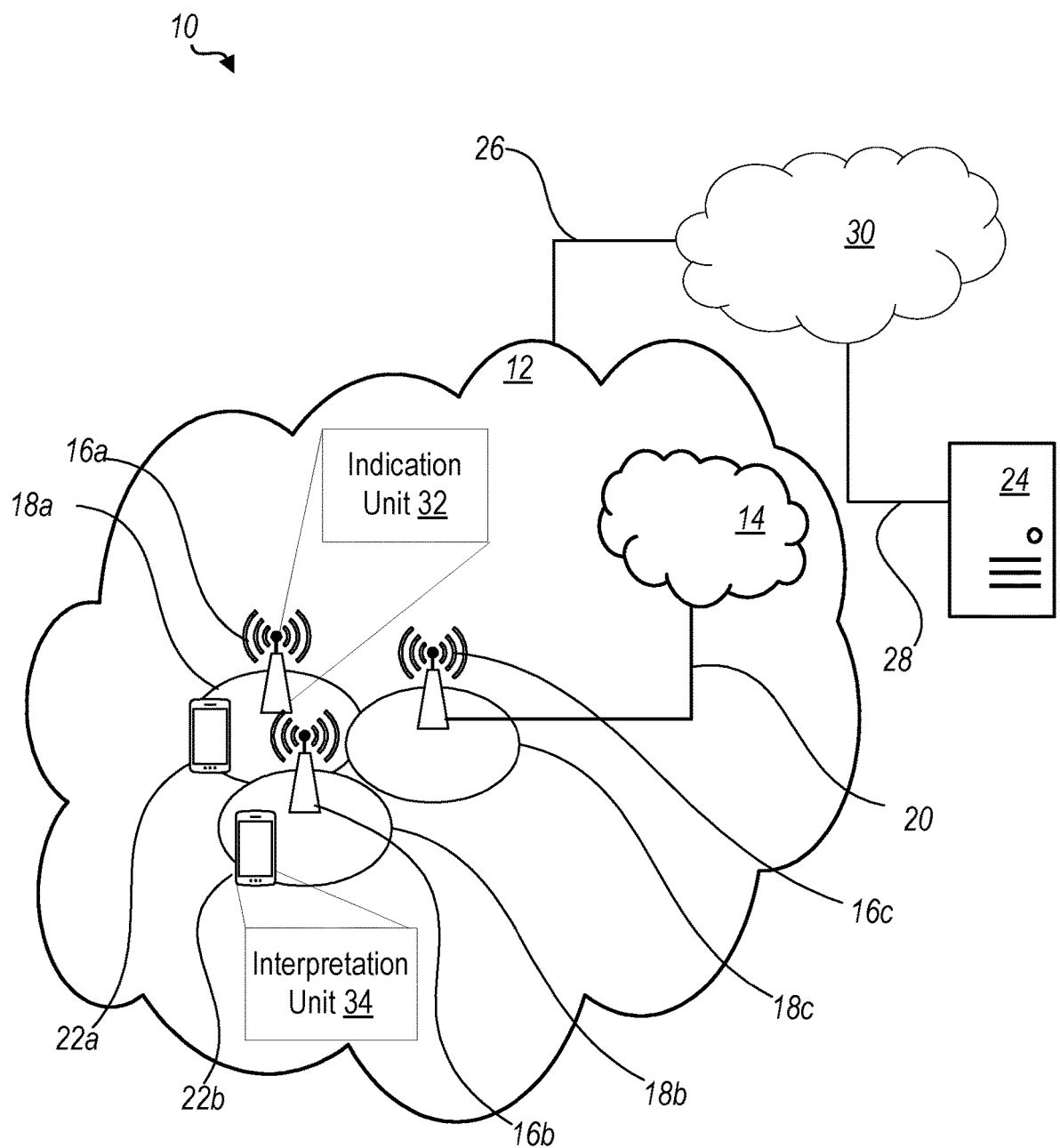
FIG. 5 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 5 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b.

While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 5 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an indication unit 32 which is configured to perform one or more network node 16 function as described herein such as with respect to layer 1 (L1) signaling indicating a transition of at least one secondary cell, Scell, one of to and from a dormant state such as a dormant bandwidth part (BWP). A wireless device 22 is configured to include an interpretation unit 34 which is configured to perform one or more wireless device 22 functions as described herein such as with respect to layer 1 (L1) signaling indicating a transition of at least one secondary cell, Scell, one of to and from a dormant state such as a dormant bandwidth part (BWP).

Example implementations, in accordance with an embodiment, of the WD 22, network node 16 and host computer 24 discussed in the preceding paragraphs will now be described with reference to FIG. 6. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to determine, process, store, transmit, relay, forward, etc., information, as described herein, related to layer 1 (L1) signaling indicating a transition of at least one secondary cell, Scell, one of to and from a dormant state such as a dormant bandwidth part (BWP).

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include indication unit 32 configured to perform one or more network node 16 functions as described herein such as with respect to L1 signaling indicating a transition of at least one secondary cell, Scell, one of to and from a dormant state such as a dormant BWP.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an interpretation unit 34 configured to perform one or more wireless device 22 functions as described herein such as with respect to L1 signaling indicating a transition of at least one secondary cell, Scell, one of to and from a dormant state such as a dormant BWP.

Figure 6:
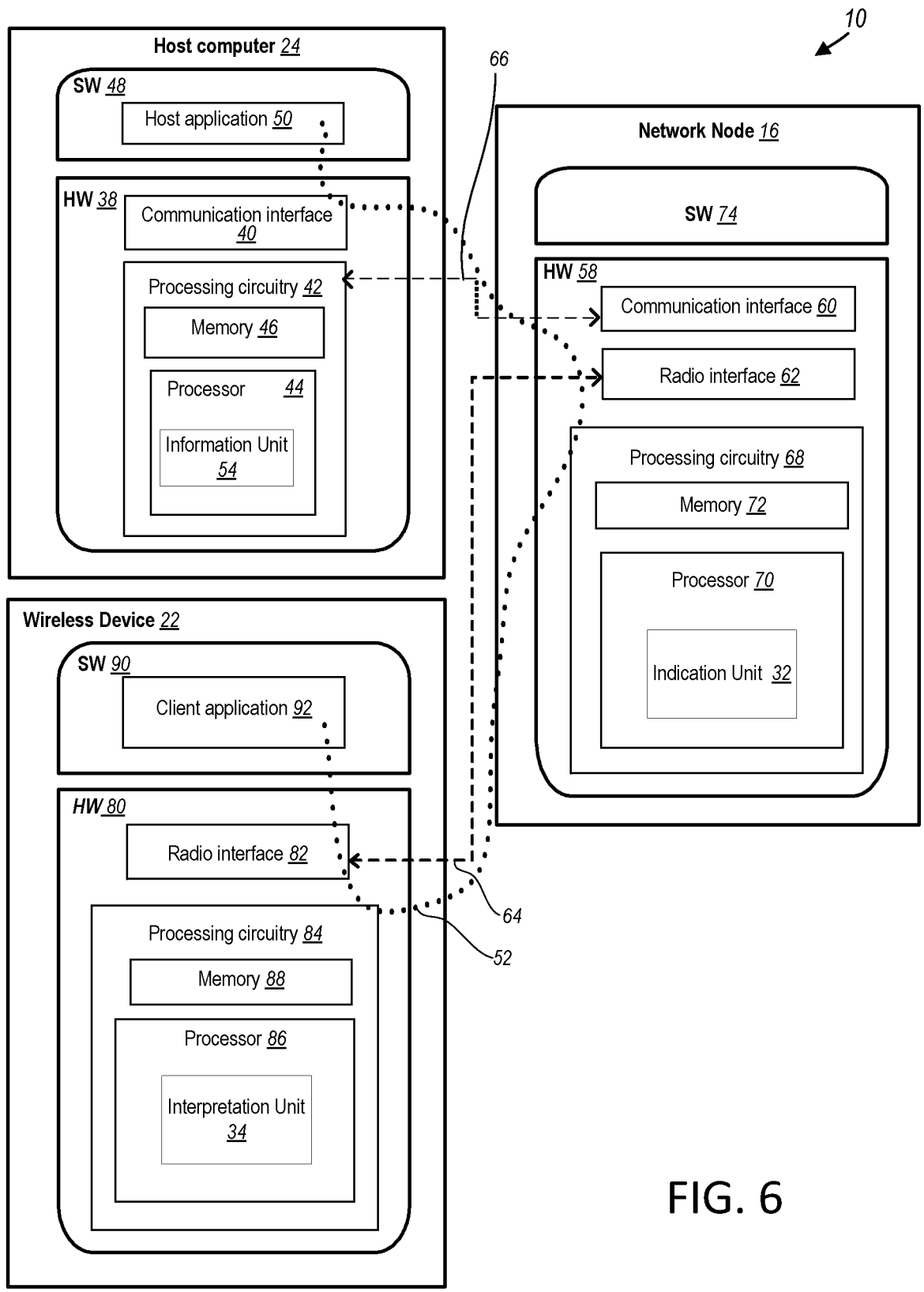
FIG. 6 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 6 and independently, the surrounding network topology may be that of FIG. 5.

In FIG. 6, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 5 and 6 show various "units" such as indication unit 32, and interpretation unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 7 is a flowchart illustrating an exemplary method implemented in a communication system, such as, for example, the communication system of FIGS. 5 and 6, in accordance with one embodiment. The communication system may include a host computer 24, a network node 16 and a WD 22, which may be those described with reference to FIG. 6. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 8 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 9 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 10 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 11:
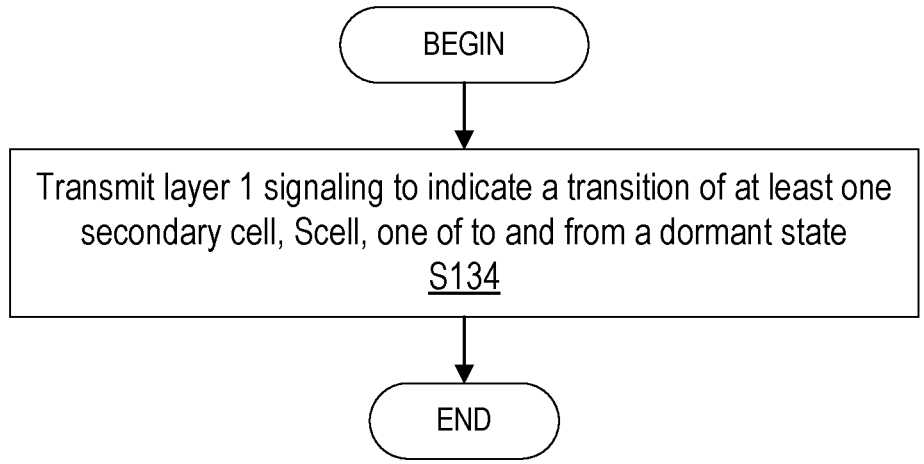
FIG. 11 is a flowchart of an example process in a network node according to some embodiments of the present disclosure.

FIG. 11 is a flowchart of an example process in a network node 16 according to some embodiment of the present disclosure. One or more Blocks and/or functions performed by network node 16 may be performed by one or more elements of network node 16 such as by indication unit 32 in processing circuitry 68, processor 70, radio interface 62, etc. In one or more embodiments, network node 16 such as via one or more of processing circuitry 68, processor 70, indication unit 32, communication interface 60 and radio interface 62 is configured to transmit (Block S134) layer 1 signaling to indicate a transition of at least one secondary cell, Scell, one of to and from a dormant state, as described herein.

According to one or more embodiments, the layer 1 signaling includes at least one bitfield in a downlink control information in a physical downlink control channel, PDCCH. According to one or more embodiments, the layer 1 signaling switches the at least one Scell to a dormant bandwidth part, BWP.

Figure 12:
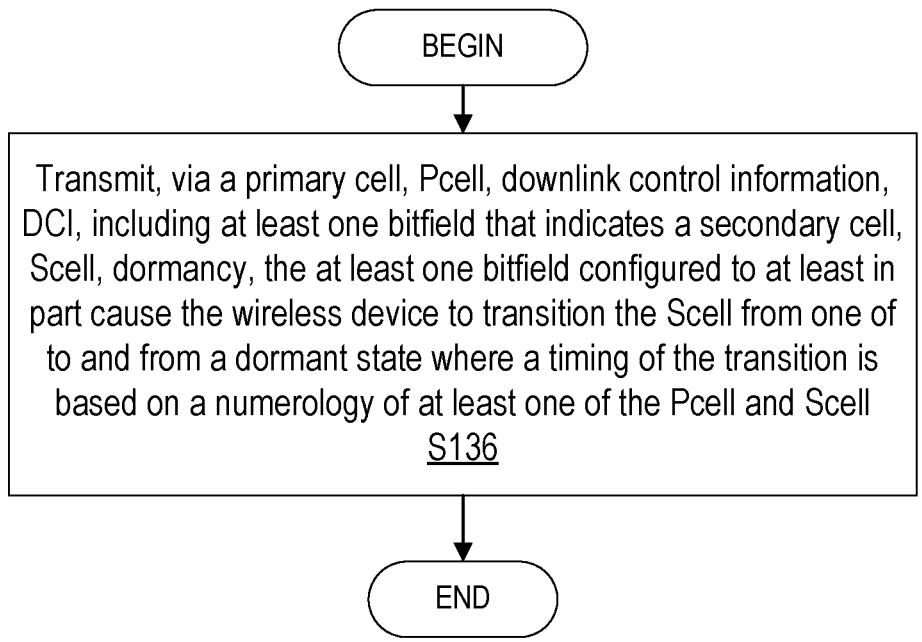
FIG. 12 is a flowchart of another example process in a network node according to some embodiments of the present disclosure

FIG. 12 is a flowchart of another example process in a network node 16 according to some embodiment of the present disclosure. One or more Blocks and/or functions performed by network node 16 may be performed by one or more elements of network node 16 such as by indication unit 32 in processing circuitry 68, processor 70, radio interface 62, etc. In one or more embodiments, network node 16 such as via one or more of processing circuitry 68, processor 70, indication unit 32, communication interface 60 and radio interface 62 is configured to transmit (Block S136), via a primary cell, Pcell, downlink control information, DCI, including at least one bitfield that indicates a secondary cell, Scell, dormancy, the at least one bitfield configured to at least in part cause the wireless device to transition the Scell from one of to and from a dormant state where a timing of the transition is based on a numerology of at least one of the Pcell and Scell, as described herein.

According to one or more embodiments, the processing circuitry 68 is further configured to set the at least one bitfield in the DCI to one of: a first value to indicate to transition to the dormant state; and a second value to indicate to transition from the dormant state, the first value being different from the second value. According to one or more embodiments, the at least one bitfield in the DCI indicates Scell dormancy based at least on setting a first bitfield in the DCI to one of: a first value for a type 1 resource allocation; and a second value for a type 0 resource allocation. According to one or more embodiments, the at least one bitfield in the DCI is configured to be interpreted based at least on a value indicated by the first bitfield in the DCI.

According to one or more embodiments, the at least one bitfield in the DCI includes at least one of a modulation and coding scheme bitfield, a new data indicator bitfield, a redundancy version bitfield, Hybrid Automatic Repeat Request, HARQ, process number bitfield, antenna port bitfield and demodulation reference signal, DMRS, sequence initialization bitfield. According to one or more embodiments, the DCI does not schedule a physical downlink shared channel, PDSCH, for the wireless device. According to one or more embodiments, the transition of one of to and from the dormant state corresponds to one of: a transition from a non-dormant bandwidth part, BWP, to a dormant BWP; and a transition from the dormant BWP to the non-dormant BWP.

According to one or more embodiments, a dormant BWP corresponds to a BWP, on the activated Scell, on which physical downlink control channel, PDCCH, monitoring is not performed by the wireless device 22. According to one or more embodiments, the the Scell dormancy indication indicates a plurality of configured Scell groups, each bit in the Scell dormancy indication corresponding to a respective Scell group of the plurality of configured Scell groups.

Figure 13:
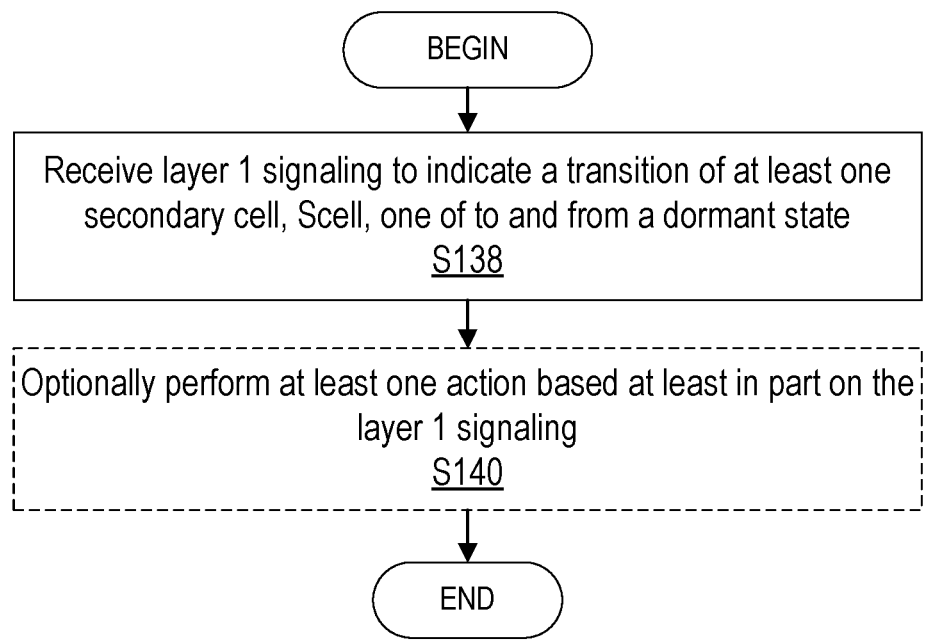
FIG. 13 is a flowchart of an example process in a wireless device according to some embodiments of the present disclosure.

FIG. 13 is a flowchart of an example process in a wireless device 22 according to some embodiments of the present disclosure. One or more Blocks and/or functions performed by wireless device 22 may be performed by one or more elements of wireless device 22 such as by interpretation unit 34 in processing circuitry 84, processor 86, radio interface 82, etc. In one or more embodiments, wireless device such as via one or more of processing circuitry 84, processor 86, interpretation unit 34 and radio interface 82 is configured to receive (Block S138) layer 1 signaling to indicate a transition of at least one secondary cell, Scell, one of to and from a dormant state. In one or more embodiments, wireless device such as via one or more of processing circuitry 84, processor 86, interpretation unit 34 and radio interface 82 is configured to optionally perform (Block S140) at least one action based at least in part on the layer 1 signaling.

According to one or more embodiments, the radio interface and/or processing circuitry is further configured to interpret the layer 1 signaling based at least in part on whether at least one dormant bandwidth part, BWP, is configured for the at least one Scell. According to one or more embodiments, if the dormant BWP is configured for the at least one Scell, the layer 1 signaling is interpreted to include a first set of bit fields in downlink control information, DCI, and if the dormant BWP is not configured for the at least one Scell, the layer 1 signaling is interpreted to include a second set of bit fields different from the first set of bit fields in the DCI.

Figure 14:
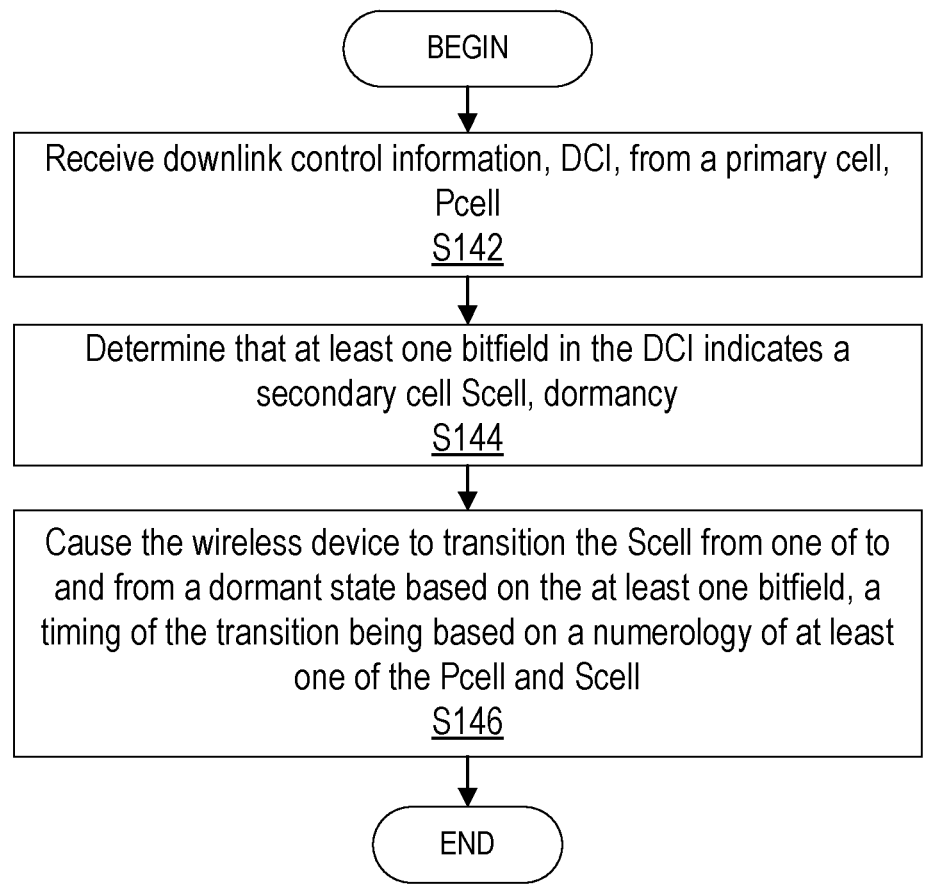
FIG. 14 is a flowchart of another example process in a wireless device according to some embodiments of the present disclosure

FIG. 14 is a flowchart of another example process in a wireless device 22 according to some embodiments of the present disclosure. One or more Blocks and/or functions performed by wireless device 22 may be performed by one or more elements of wireless device 22 such as by interpretation unit 34 in processing circuitry 84, processor 86, radio interface 82, etc. In one or more embodiments, wireless device 22 such as via one or more of processing circuitry 84, processor 86, interpretation unit 34 and radio interface 82 is configured to receive (Block S142) downlink control information, DCI, from a primary cell, Pcell, as described herein. In one or more embodiments, wireless device 22 such as via one or more of processing circuitry 84, processor 86, interpretation unit 34 and radio interface 82 is configured to determine (Block S144) that at least one bitfield in the DCI indicates a secondary cell Scell, dormancy, as described herein. In one or more embodiments, wireless device 22 such as via one or more of processing circuitry 84, processor 86, interpretation unit 34 and radio interface 82 is configured to cause (Block S146) the wireless device 22 to transition the Scell from one of to and from a dormant state based on the at least one bitfield where a timing of the transition is based on a numerology of at least one of the Pcell and Scell, as described herein.

According to one or more embodiments, the at least one bitfield in the DCI is one of: set to a first value to indicate to transition to the dormant state; and set to a second value to indicate to transition from the dormant state, the first value being different from the second value. According to one or more embodiments, the determining that the at least one bitfield in the DCI indicates the Scell dormancy is based on a first bitfield in the DCI being set to one of: a first value for a type 1 resource allocation; and a second value for a type 0 resource allocation. According to one or more embodiments, the processing circuitry is further configured to interpret the at least one bitfield in the DCI based at least on a value indicated by the first bitfield in the DCI.

According to one or more embodiments, the first bitfield is a frequency domain resource allocation, FDRA, field. According to one or more embodiments, the at least one bitfield in the DCI includes at least one of a modulation and coding scheme bitfield, a new data indicator bitfield, a redundancy version bitfield, Hybrid Automatic Repeat Request, HARQ, process number bitfield, antenna port bitfield and demodulation reference signal, DMRS, sequence initialization bitfield. According to one or more embodiments, the processing circuitry is further configured to determine that the DCI does not schedule a physical downlink shared channel, PDSCH, for the wireless device.

According to one or more embodiments, the transition of one of to and from a dormant state corresponds to one of: a transition from a non-dormant bandwidth part, BWP, to a dormant BWP; and a transition from the dormant BWP to the non-dormant BWP. According to one or more embodiments, a dormant BWP corresponds to a BWP, on the activated Scell, on which physical downlink control channel, PDCCH, monitoring is not performed by the wireless device. According to one or more embodiments, the Scell dormancy indication indicates a plurality of configured Scell groups, each bit in the Scell dormancy indication corresponding to a respective Scell group of the plurality of configured Scell groups.

Having generally described arrangements for L1 signaling indicating a transition of at least one secondary cell, Scell, one of to and from a dormant state such as a dormant BWP, details for these arrangements, functions and processes are provided as follows, and which may be implemented by the network node 16, wireless device 22 and/or host computer 24.

Embodiments provide L1 signaling indicating a transition of at least one secondary cell, Scell, one of to and from a dormant state such as a dormant BWP. For example, in one or more embodiments, DCI is signaled to a wireless device 22 where the DCI includes at least one bitfield that indicates a Scell dormancy where the at least one bitfield is configured to at least in part cause the wireless device 22 to transition the Scell from one of to and from a dormant state where a timing of the transition is based on a numerology of at least one of the Pcell and Scell. That is, a wireless device 22 may be configured with a Scell where, based on an indication provided by the DCI, the wireless device 22 may transition the Scell to/from a dormant BWP.

Example

In one or more embodiments, a wireless device 22 such as via one or more of processing circuitry 84, processor 86, radio interface 82, interpretation unit 34, etc., communicates with the network using a primary serving cell (e.g., Pcell or PScell) that may be provided by network node 16. The wireless device 22 is also configured with one or more secondary serving cells (Scell(s)). The wireless device 22 such as via one or more of processing circuitry 84, processor 86, radio interface 82, interpretation unit 34, etc., receives a higher layer Scell activation/deactivation command. Upon reception of the higher layer activation/deactivation command, the wireless device 22 such as via one or more of processing circuitry 84, processor 86, radio interface 82, interpretation unit 34, etc., starts/stops performing a first set of actions. The first set of actions include periodic CSI reporting for the Scell, e.g., if the wireless device 22 is configured for periodic CSI reporting.

The first set of actions can also include PDCCH monitoring on the Scell. If the wireless device 22 is configured with multiple BWPs for the Scell, the PDCCH monitoring can be on a preconfigured/default BWP of the Scell. If the wireless device 22 such as via one or more of processing circuitry 84, processor 86, radio interface 82, interpretation unit 34, etc., receives the higher layer activation command in time slot n, the wireless device 22 such as via one or more of processing circuitry 84, processor 86, radio interface 82, interpretation unit 34, etc., applies the first set of actions starting with slot n+D1 (i.e., after an activation delay of D1 slots). The wireless device 22 such as via one or more of processing circuitry 84, processor 86, radio interface 82, interpretation unit 34, etc., also receives a physical layer command (L1 command). Upon reception of the L1 command, the wireless device 22 such as via one or more of processing circuitry 84, processor 86, radio interface 82, interpretation unit 34, etc., starts/stops performing a second set of actions. The second set of actions can be PDCCH monitoring or BWP switching. The second set of actions can be triggered by switching the wireless device 22 to a specific BWP on the SCell. The specific BWP can be a dormant BWP.

Stopping PDCCH monitoring on an activated Scell (e.g., second set of actions) but continuing to perform CSI reporting for the SCell can be considered as transitioning to dormancy-like behavior on the activated Scell. Alternately, transitioning to a dormant BWP can be considered as transitioning to dormancy-like behavior on the activated Scell. Similarly starting PDCCH monitoring or switching to a BWP that is not a dormant BWP can be considered as transitioning out of dormancy-like behavior on the activated Scell.

If the wireless device 22 such as via one or more of processing circuitry 84, processor 86, radio interface 82, interpretation unit 34, etc., receives the L1 command in time slot in, the wireless device 22 such as via one or more of processing circuitry 84, processor 86, radio interface 82, interpretation unit 34, etc., applies the second set of actions (or transitions to dormancy like behavior, or switches to dormant BWP) starting with slot n1+D2 (i.e., after a delay of D2 slots). The delay D2 is smaller than D1.

The higher layer Scell activation/deactivation command can be received by the wireless device 22 such as via one or more of processing circuitry 84, processor 86, radio interface 82, interpretation unit 34, etc., in a MAC CE (MAC control element). The first set of actions can also include transmitting PUCCH/periodic SRS on the Scell.

The L1 command can be received by the wireless device 22 such as via one or more of processing circuitry 84, processor 86, radio interface 82, interpretation unit 34, etc., using a PDCCH. For example, the L1 command can be part of PDCCH DCI (downlink control information). The PDCCH DCI corresponding to the L1 command can include the bits corresponding to the Scell(s) configured for the wireless device 22. Based on the L1 command on the Pcell, the wireless device 22 such as via one or more of processing circuitry 84, processor 86, radio interface 82, interpretation unit 34, etc., can switch to a dormant BWP on the Scell.

Below, in the "L1 Command for dormancy indication" section, signaling details for the L1 command are described.

In the "Dormant BWP" section dormant BWP (i.e., which may be referred to as a dormant state) and signaling details are discussed.

L1 Command for Dormancy Indication

The DCI bits for dormancy indication (i.e., L1 command) can be part of PDCCH DCI. They can be sent to the wireless device 22 (e.g., from network node 16 such as via one or more of processing circuitry 68, processor 70, radio interface 62, indication unit 32, etc.) as a specific bitfield in PDCCH DCI format 0-1 or 1-1 or other DCI formats. The PDCCH DCI format can be monitored on the primary cell. For wireless device 22 configured with dual connectivity, the primary cell can be Pcell or PScell. The PDCCH DCI format 0-1 is generally used for scheduling PUSCH (uplink) transmissions. PDCCH DCI format 1-1 is generally used for scheduling PDSCH (downlink) transmissions.

In one example, the wireless device 22 configured with a Pcell and one or more Scells determines the contents of a PDCCH DCI format based on whether at least one dormant BWP is configured for at least one of the SCells.

In one alternative, if at least one dormant BWP is configured for the wireless device 22, the wireless device 22 such as via one or more of processing circuitry 84, processor 86, radio interface 82, interpretation unit 34, etc., determines that a PDCCH DCI format includes a first set of bit fields, otherwise it determines that the PDCCH DCI format includes a second set of bit fields. For example, the first set of bit fields can include a Scell-dormancy-indication-type bit, while the second set of bit fields does not include this bit.

In another alternative, the wireless device 22 such as via one or more of processing circuitry 84, processor 86, radio interface 82, interpretation unit 34, etc., applies certain procedures when one or more bitfields in a DCI format are set to a first value and if at least one dormant BWP is configured; otherwise, it does not apply the procedures.

For example (Embodiment 1), considering PDCCH DCI formats 0-1, 1-1,

If wireless device 22 is configured with at least one dormant BWP for any Scell, and
  If
    FDRA bit field is set to all 1s (or a first specific value) when type 1 Resource Allocation (RA) is used for wireless device 22 or
    FDRA bit field is set to all 0s (or a second specific value) when only type 0 RA is used for the wireless device 22
  Then, the wireless device 22 such as via one or more of processing circuitry 84, processor 86, radio interface 82, interpretation unit 34, etc., determines one or more of the following conditions for the PDCCH DCI format
    Wireless device 22 such as via one or more of processing circuitry 84, processor 86, radio interface 82, interpretation unit 34, etc., can determine that no PDSCH or PUSCH is scheduled for the wireless device 22 using that PDCCH
    Wireless device 22 such as via one or more of processing circuitry 84, processor 86, radio interface 82, interpretation unit 34, etc., can determine that one or more of the following bit-fields (set 1) are not present (or reused for Scell dormancy indication or considered present but with bitwidth of 0)
      Modulation and coding scheme (e.g., typically 5 bits)
      New data indicator (e.g., typically 1 bit)
      Redundancy version (e.g., typically 2 bits)
      HARQ process number (e.g., typically 4 bits)
      Antenna port(s) (e.g., typically at least the first 2 bits of the 4, 5, or 6 bits of this bits field)
      DMRS sequence initialization ((e.g., typically 1 or more bits, if present)
    Wireless device 22 such as via one or more of processing circuitry 84, processor 86, radio interface 82, interpretation unit 34, etc., can determine that a bitfield for Scell dormancy indication is present and the number of bits used for Scell dormancy indication is one of
      Number of configured SCells for the wireless device 22 or
      Number of configured Scells for the wireless device 22 that are also configured with a dormant BWP
    Wireless device 22 such as via one or more of processing circuitry 84, processor 86, radio interface 82, interpretation unit 34, etc., can determine that one or more of the following fields are present (set 2)
      TPC command for scheduled PUCCH
      PDSCH-to-HARQ_feedback timing indicator
      SRS request
      Downlink assignment index
If the wireless device 22 is not configured with a dormant BWP for any Scell, the wireless device such as via one or more of processing circuitry 84, processor 86, radio interface 82, interpretation unit 34, etc., can determine that both set 1 and set 2 bitfields above are present in the DCI format for any value of the FDRA bitfield.

In another variant of Embodiment 1, a combination of UL-SCH indicator field set to value 0 and CSI request field set to all zero(s) can be used instead of FDRA bit field being set to all 1s or 0s. This variant is applicable for PDCCH DCI format 0-1.

In another variant of Embodiment 1, higher layers (e.g., RRC) can configure the wireless device 22 with X number of Scell groups based on which Scell dormancy is indicated with 1 bit per Scell group. Alternatively, higher layers can configure the wireless device 22 with X bits for Scell dormancy indication. The wireless device 22 such as via one or more of processing circuitry 84, processor 86, radio interface 82, interpretation unit 34, etc., may apply the above procedures (e.g., those in this example or variants of this example), only if higher layer configuration is such that X=0 (or when the corresponding higher layer parameters are not configured). When X>0 is configured, the X bit bitfield for determining dormancy/non-dormancy of Scells.

In Another Example (Embodiment 2)
  If a Scell-dormancy-indication-type bit in a DCI format (e.g., DCI format 0-1, 1-1) indicates a first value (e.g., 0), the wireless device 22 such as via one or more of processing circuitry 84, processor 86, radio interface 82, interpretation unit 34, etc., may determine that:
    A PDSCH or PUSCH is scheduled by the DCI format, or the PDCCH DCI contains bitfields used for PUSCH, PDSCH scheduling (e.g. some or all of the set 1 fields described in above Embodiment 1)
    The DCI format is also used for Scell dormancy indication using a bitfield with a first number of bits for dormancy indication. The first number of bits for dormancy indication can be configured via higher layers, either directly or indirectly. For example, higher layers configure X bits for dormancy indication, or alternately higher layers configure X Scell groups and 1 bit per Scell group is used in the DCI for dormancy indication. X can be configured to be zero or assumed to be zero when corresponding higher layer configuration is absent)
  If the Scell-dormancy-indication-type bit in the DCI indicates a second value (e.g., 1), the wireless device 22 such as via one or more of processing circuitry 84, processor 86, radio interface 82, interpretation unit 34, etc., may determine that
    A PDSCH or PUSCH is not scheduled by the DCI format, or that the PDCCH DCI does not contain some or all of the set 1 bitfields described in above example 1.
    and the DCI format is also used for Scell dormancy indication using a bitfield with a second number of bits
      The second number can be larger than the first number
      The second number can be number of configured SCells for the wireless device 22 or
      The second number can be number of configured Scells also configured with a dormant BWP In one variant of the above Embodiment 2, the wireless device 22 such as via one or more of processing circuitry 84, processor 86, radio interface 82, interpretation unit 34, etc., may determine that Scell-dormancy-indication-type bit is present in the DCI only if X=0.

In some cases, the wireless device 22 such as via one or more of processing circuitry 84, processor 86, radio interface 82, interpretation unit 34, etc., determines that presence or not of a Scell-dormancy-indication-type bit based on higher later configuration (e.g., RRC).

Application Delay

The application delay (or delay for applying dormancy indication) for a dormancy indication in a DCI received on the PCell can be based on one or multiple factors including one or more of the following:

- DCI decoding delay (e.g., may be based on the Pcell numerology and processing time)
  - This can be different for different cases if the Pcell is configured with cross-slot power savings mechanism or not. For example, the DCI decoding delay can be 6 symbols for a 30 kHz SCS with no cross-slot power savings configured, Alternatively, the decoding delay may be larger (6+n*14) for a 30 KHz SCS with cross-slot power savings configured where n may be integer such as 1, 2, 3 . . .
- Delay based on Numerology of the Scell and/or Pcell
  - If the Scell has BWPs with different numerologies or the Pcell has a different numerology than Scell, then there can be a delay that is added based on the involved numerologies in the application.
- Delay based on minimum wireless device 22 preparation time for transitioning from dormancy to non-dormancy and vice-versa
- Some of more of the above delays may be additive. For example, the DCI decoding delay and min wireless device 22 preparation time after DCI decoding together may be reflected in the overall application delay.

The application delay can be configured (X slots) via higher layer signaling, e.g., based on wireless device 22 capability signaling that indicates how much time the wireless device 22 may need to prepare.

The application delay can be at a known value (X slots or Y ms after the slot where the indication is received) based on different conditions. If Pcell and Scell have different numerologies, if indication is received in Pcell's slot n, the application can be in the slot of Scell that is after the last slot of Scell that overlaps slot n+X of the Pcell. Alternatively, a translation mechanism depending on the SCSes of Pcell and Scell, using scaling factors can be derived for application delay.

Grouping Details

Group indication via higher layers (e.g., RRC) can be performed in different methods. For each group, a bitmap is used wherein the length of the bitmap is given by the number of configured Scells or by the number of configured Scells with dormant BWP.

An Scell belongs to the group if the bit corresponding to the Scell is set to first value (e.g., 1) and does not belong to the group if the bit corresponding to the Scell is set to a second value (e.g. 0).

In one example, Scell belongs to the group regardless of the activated/deactivated state for that Scell. In such a case, the dormancy indication on the L1 may be considered as applicable for the Scell only when the Scell is activated. The dormancy indication on the L1 is not applicable for an Scell when that Scell is deactivated.

If an Scell is transitioning from deactivated to activated is ongoing (i.e., the wireless device 22 activation procedure is not completed), then the wireless device 22 such as via one or more of processing circuitry 84, processor 86, radio interface 82, interpretation unit 34, etc., may ignore the dormancy indication for that Scell until the activation procedure is completed. A wireless device 22 such as via one or more of processing circuitry 84, processor 86, radio interface 82, interpretation unit 34, etc., may not expect a dormancy indication indicating transition to dormancy BWP for an Scell when the corresponding Scell activation procedure is ongoing. A wireless device 22 such as via one or more of processing circuitry 84, processor 86, radio interface 82, interpretation unit 34, etc., may expect that a dormancy indication for an Scell is applicable from the first slot where wireless device 22 starts reporting CQI for an activated Scell (e.g., the first slot that is after a pre-determined slots after the wireless device 22 reports HARQ feedback for the activation MAC CE).

The BWP Id corresponding to the dormant BWP cannot be configured as the BWP on which the Scell activation procedure occurs. In some cases, the BWP Id corresponding to the dormant BWP can be configured or indicated as the BWP on which the Scell activation procedure occurs.

In another example, if an Scell is deactivated, then the corresponding Scell does not belong to the group. If an Scell is activated, the corresponding Scell belongs to the group. Thus, based on the activation/deactivation, the grouping can change. However, the grouping is considered to be automatically updated based on activated/deactivated state of an Scell without requiring RRC configuration. In such a case, the determination of whether an Scell is activated or deactivated (i.e., whether the activated/deactivated Scell belongs to a group or not) has to be performed at a reference slot for the Pcell. The reference slot can be the latest slot for the Scell that overlaps the slot for the Pcell where the dormancy indicator is being received.

Upon reception of deactivation command, if the wireless device 22 was in dormant BWP, the wireless device 22 such as via one or more of processing circuitry 84, processor 86, radio interface 82, interpretation unit 34, etc., transitions to the deactivated state and correspondingly transitions to another regular BWP.

Alternatively, the wireless device 22 such as via one or more of processing circuitry 84, processor 86, radio interface 82, interpretation unit 34, etc., can stay in the dormant BWP when it is in deactivated state and upon reception of an activation command, the wireless device 22 transitions to a regular BWP. Thus, it can be allowed or not allowed for a wireless device 22 to remain in dormant BWP on an Scell when the Scell is in deactivated state.

A wireless device 22 can be configured with 1 wireless device-specific RRC configured BWP that is regular BWP (e.g., BWPa).

The wireless device 22 can be indicated with another field (e.g., cloneDormantBWP) that configures the wireless device 22 to derive a dormant BWP that is cloned or that acquires/follows the corresponding regular BWP configuration except for one or more specific parameters/actions such as stop PDCCH monitoring. In one or more embodiments, the indication is provided by the network node 16 such as via one or more of processing circuitry 68, processor 70, radio interface 62, indication unit 32, etc.

In another example, the wireless device 22 can be indicated with another field (e.g., cloneDormancy) that configures/causes the wireless device 22 to derive a dormancy behavior that is cloned or that acquires/follows the corresponding regular BWP configuration except for one or more specific parameters/actions such as, for example, stopping PDCCH monitoring. A wireless device 22 such as via one or more of processing circuitry 84, processor 86, radio interface 82, interpretation unit 34, etc., may indicate its support for dormant BWP using a separate set of capability signaling. For example, a wireless device 22 such as via one or more of processing circuitry 84, processor 86, radio interface 82, interpretation unit 34, etc., may indicate it supports 1 wireless device-specific RRC configured BWP that is a regular BWP, and that it supports a dormant BWP as a second RRC configured—the wireless device 22 may not indicate that it supports 2 wireless device-specific RRC configured BWPs that are regular BWPs. Such wireless devices 22 such as via one or more of processing circuitry 84, processor 86, radio interface 82, interpretation unit 34, etc., can make full use of power savings and benefits for dormancy behavior without needing to support a lot of the inessential functionality that needs to be supported with 2 wireless device-specific RRC configured BWPs that are regular BWPs.

In one or more examples, a Pcell dormancy can be enabled by enhancing the Scell dormancy indication. In this case, the Pcell can also be included in the grouping. In addition, the higher layer configuration can also include a 'duration' for a corresponding group that contains Pcell. The 'duration' indicates an amount of time the Pcell can be in dormancy upon reception a dormancy indication for the Pcell (e.g., telling the wireless device 22 to go to Pcell dormancy). The wireless device 22 such as via one or more of processing circuitry 84, processor 86, radio interface 82, interpretation unit 34, etc., can then stop PDCCH decoding for the PCell for the indicated duration and return to non-dormancy after the duration is performed. Additionally, for that duration, the wireless device 22 such as via one or more of processing circuitry 84, processor 86, radio interface 82, interpretation unit 34, etc., can stop PDCCH monitoring for the Scells for the duration.

Dormant BWP

The dormant BWP can be a BWP with at least one or more of the following characteristics:
  The dormant BWP is not configured with PDCCH monitoring (e.g., the information element (IE) pdcch-Config is absent in the BWP configuration)
  The dormant BWP is configured only when wireless device 22 is configured with at least one other wireless device-specific RRC configured BWP (i.e., a 'regular BWP')
  The wireless device 22 such as via one or more of processing circuitry 84, processor 86, radio interface 82, interpretation unit 34, etc., determines via RRC configuration, which DL BWP among the wireless device-specific RRC configured BWPs is the dormant BWP.

In addition to the above, BWP#0 (or initial BWP) may not be assumed to be a dormant BWP at least for the case of BWP#0 configuration without dedicated configuration (i.e., Option 1 in wireless communication standards such as in 3GPP TS 38.331)

For identifying the dormant BWP among the RRC configured BWPs, one option may be to configure such as by the network node 16 such as via one or more of processing circuitry 68, processor 70, radio interface 62, indication unit 32, etc., the dormant BWP ID explicitly via RRC (e.g., a new field dormantBWP-Id as part of ServingCellConfig).

Another option is to have a restriction that only one BWP among the RRC configured BWPs can be configured without PDCCH monitoring, and BWP ID of that BWP is implicitly assumed as dormant BWP. One drawback with this approach is that some other configuration to differentiate the dormant BWP of, for example, 3GPP Rel16 from an equivalent 3GPP Rel15 BWP configuration may be needed to enable the 3GPP Rel16 procedures related to dormant BWP.

Another option is to introduce a new field dormantBWP-Idreference and configure the BWP ID of a reference BWP which is used as reference for dormant BWP configuration.

Then the wireless device 22 such as via one or more of processing circuitry 84, processor 86, radio interface 82, interpretation unit 34, etc., assumes that dormant BWP has identical configuration as the reference BWP except for some predefined/prespecified such as PDCCH monitoring and SRS transmission. For example, the wireless device 22 does not perform PDCCH monitoring and SRS transmission when switched to dormant BWP.

In a yet another option, a new parameter field isDormantBWP is introduced within BWP configuration and if the parameter is set to 'true', the parameter denotes the corresponding BWP is a dormant BWP, and if the parameter is absent or set to 'false', the corresponding BWP is not considered as a dormant BWP (e.g., considered a regular BWP).

When dormant BWP is configured for an Scell, in most cases it increases the DCI payload size for the Scell by 1 additional bit for the "Bandwidth part indicator" field.

For example, assuming Option 2 BWP#0 configuration, without a dormant BWP it is possible to operate and Scell with 0 bit BWP indicator field, but configuring a dormant BWP may require a 1 bit field. Similarly, with Option 1 BWP#0 configuration, the 1 bit field may need to be increased to two bits.

Since switching to/from dormant BWP is already indicated on Pcell, the additional bit in the Scell DCI is mostly redundant. For example, if one extra bit is added to Pcell DCI to indicate transition to/from dormant BWP of the Scell, in principle there is no need to have one more extra bit in the Scell DCI when the extra bit in Pcell DCI is always present. Also for cases where the dormant BWP is configured to be same as default BWP, the BWP inactivity timer provides one more option to switch to dormant BWP, making the extra bit more redundant.

This extra overhead can be avoided by not considering the dormant BWP as part of the number of BWPs ($n^{BWP,RRC}$) configured by higher layers while determining DCI payload of the Scells (i.e., considering only those BWPs that are not configured as dormant BWP for DCI payload calculation).

In another option, whether the dormant BWP is considered or not when determining the size of BWP indicator field for the Scell DCI can be based on one or more of below criteria:
  The dormant BWP can be considered such as by wireless device 22 such as via one or more of processing circuitry 84, processor 86, radio interface 82, interpretation unit 34, etc., only if its BWP ID is in a certain range. For example, if BWP ID of dormant BWP is configured to be <=4, it is considered, otherwise it is not considered.
  The dormant BWP can be considered or not such as by wireless device 22 such as via one or more of processing circuitry 84, processor 86, radio interface 82, interpretation unit 34, etc., based on the payload size of the DCI field used for Scell dormancy indication on the Pcell. For example, if the payload size of the Pcell DCI field is >0 bits, the BWP ID of dormant BWP is considered for determining the size of BWP indicator field for the Scell DCI, otherwise it is not considered.
  A higher layer (e.g. RRC) indication configuring whether to count or not count the dormant BWP.

In some cases, whether the dormant BWP is considered or not when determining the size of BWP indicator field for the Scell DCI can be based whether a Scell-dormancy-indication-type bit is included in Pcell DCI.

When an Scell PDCCH is used for switching from a regular BWP to dormant BWP, the corresponding scheduled PDSCH can be considered as a null resource to avoid unnecessary uplink transmission from the wireless device 22 (HARQ feedback, etc.)—this may occur since that PDSCH cannot be retransmitted (in case HARQ-feedback). In essence, it may be disadvantageous to use Scell PDCCH for switching from a regular to dormant BWP unless the last scheduled TBS can be sacrificed (e.g., long delay or dummy). It may be more beneficial to use Pcell indication for switching between regular and dormant BWP.

When dormancy is indicated for an Scell, in addition to stopping PDCCH monitoring, the wireless device 22 such as via one or more of processing circuitry 84, processor 86, radio interface 82, interpretation unit 34, etc., may stop periodic SRS transmissions on the Scell (if configured).

To enable this, one option is to create the notion of an UL dormant BWP (e.g. an UL BWP configured without periodic SRS transmission or periodic SRS transmission with sparse periodicity e.g., periodicity longer than a predefined value), and a DL dormant BWP (e.g., DL BWP configured without PDCCH monitoring) and assume that the wireless device 22 such as via one or more of processing circuitry 84, processor 86, radio interface 82, interpretation unit 34, etc., switches to both the UL dormant BWP and the DL dormant BWP on the Scell when the L1 command on the Pcell indicates transition to dormancy.

Another option is to use a wireless device 22 procedure according to which the wireless device 22 does not perform periodic SRS transmissions on an Scell when Pcell (i.e., network node 16) indicates transition to dormancy for that Scell, such as, for example, by configuring a DL dormant BWP for the Scell and adding a wireless device 22 procedure that SRS transmissions (at least periodic SRS transmissions) are stopped on the SCell when a switch to the DL dormant BWP is indicated via the L1 command.

Aperiodic SRS transmissions on the Scell (if triggered by DCI from a scheduling cell other than Scell) may still be performed even when the current active BWP for the Scell is the dormant BWP. In some examples, aperiodic SRS transmissions on a dormant UL BWP of an Scell are triggered by DCI received on the primary cell.

In general, when transition to dormant BWP is indicated for an Scell, the wireless device 22 such as via one or more of processing circuitry 84, processor 86, radio interface 82, interpretation unit 34, etc., may stop transmitting periodic SRS on the Scell. No separate UL dormant BWP configuration may be introduced.

The dormant BWP can be configured such as via one or more of processing circuitry 68, processor 70, radio interface 62, indication unit 32, etc., such that some attributes of the dormant BWP are constrained to be the same as those configured for at least one other BWP configured for the wireless device 22.

For example, the dormant BWP can be constrained to have same BW as at least one other BWP configured for the wireless device 22;

In another example, the dormant BWP can be constrained to have one or more of following parameters to be same as at least one other BWP configured for the wireless device 22;

locationAndBandwidth (e.g., a parameter indicating the location and number of frequency domain resource blocks that correspond to the BWP)

subcarrierSpacing (e.g., a parameter indicating the subcarrier spacing of OFDM transmissions corresponding to the BWP)

cyclicPrefix (e.g., a parameter indicating the cyclic prefix of OFDM transmissions corresponding to the BWP)

In another example, transmissions on the dormant BWP can be assumed to be constrained such that they follow the same beam, spatial parameters, transmission control indication (TCI) state as that of one of at least one other BWP configured for the wireless device 22;

In another example, an explicit higher layer parameter is introduced to indicate the linkage between the dormant BWP and that of one at least one other BWP configured for the wireless device 22 with which the dormant BWP shares certain constraints, e.g., same SCS/locationAndBandwidth, cyclicPrefix, etc.

In yet another example, the dormant BWP configuration can explicitly include a higher layer parameter indicating the other BWP that is linked to the dormant BWP (linkedBWP-Id).

In yet another example, the regular BWP configuration can explicitly include a higher layer parameter flag indicating the regular BWP is linked to the dormant BWP (linkedToDormantBWP).

In an example, for an Scell, the transition between dormancy behavior to non-dormancy behavior means transitioning between dormancy BWP to the other regular BWP with which the dormant BWP is linked. Although this may imply a restriction on BWP switching flexibility when there are several BWPs, a primary benefit is that a lot of information/processing (CSI/beam management) from dormant BWP is readily available and usable when the other regular BWP is activated for data transmission/reception.

In an example, for an Scell, the transition between non-dormancy behavior to dormancy behavior means transitioning between current active BWP to the dormant BWP.

If the BWP indicator field in the Scell DCI indicates switching to a BWP identified as dormant BWP, the corresponding PDSCH/PUSCH resource allocation and associated fields (e.g., resource allocation, etc.) may be indicated as 'reserved' in the DCI, i.e., the DCI may be interpreted as not scheduling any data. The wireless device 22 such as via one or more of processing circuitry 84, processor 86, radio interface 82, interpretation unit 34, etc., may discard the PDSCH/PUSCH resource allocation included in the Scell DCI, and not receive/transmit the corresponding PDSCH/PUSCH. The wireless device 22 may or may not transmit any corresponding HARQ-ACK. The HARQ-ACK information can provide confirmation that the switching command was successfully received by the wireless device 22. If such confirmation is not considered beneficial, the HARQ-ACK transmission is not necessary and the corresponding fields in the DCI could also be considered as reserved.

In one example, if some of the PDCCH search spaces in the dormant BWP are configured with search space periodicity set to inf (infinity), the wireless device 22 such as via one or more of processing circuitry 84, processor 86, radio interface 82, interpretation unit 34, etc., may assume that PDCCH BDs for those search spaces are not required for the SCell when switched to the dormant BWP (i.e., is considered active).

A dormant BWP can have an attribute that there is no data or PDSCH scheduling allowed for it (and similarly for uplink, there is no PUSCH scheduling allowed for it), i.e., the frequency domain or time domain resource allocation field for a dormant BWP is considered as reserved. Still, for dormancy BWP, some minimum configuration related to PDSCH may be needed such as those necessary for ensuring the proper CSI measurement and reporting, including any potential minimum scheduling offset configuration for triggering aperiodic CSI-RS transmission, measurement and reporting.

In some cases, switching delay from/to a dormant BWP to regular BWP can be based on whether some attributes (e.g., the attributes discussed above) of the dormant BWP are same as that of the regular BWP. For example, if above parameters or TCI state assumptions (e.g., for CSI measurements) of dormant and regular BWP are same, the switching delay can be a first value, otherwise it can be a second value larger than first value. In some cases, the first value is smaller than the second value.

The switching delay can be the delay D2 discussed above. The switching delay can be a maximum allowed delay for the wireless device 22.

If the BWP indicator field in the Scell DCI indicates switching to a BWP identified as dormant BWP, the wireless device 22 such as via one or more of processing circuitry 84, processor 86, radio interface 82, interpretation unit 34, etc., may discard the PDSCH/PUSCH resource allocation included in the Scell DCI, and not receive/transmit the corresponding PDSCH/PUSCH. The wireless device 22 such as via one or more of processing circuitry 84, processor 86, radio interface 82, interpretation unit 34, etc., may transmit any corresponding HARQ-ACK.

Therefore, one or more embodiments and/or examples described herein advantageously provide a mechanism where the wireless device 22 such as via one or more of processing circuitry 84, processor 86, radio interface 82, interpretation unit 34, etc., determines bit-fields of a PDCCH DCI format received on a primary cell (i.e., from a primary cell) based on whether or not a dormant BWP is configured for at least on secondary serving cell (Scell).

One or more embodiments and/or examples described herein advantageously provide a mechanism where if the wireless device 22 such as via one or more of processing circuitry 84, processor 86, radio interface 82, interpretation unit 34, etc., is configured with at least one dormant BWP, and if a first bitfield (e.g., FDRA) in a DCI format is set to a first value, the wireless device 22 assumes that a) a first set of bitfields in the DCI format are not present, b) a second set of bitfields in the DCI format are present, and c) a Scell dormancy indication bitfield of a first length is present; otherwise, if the first bitfield is set to a second value, the wireless device 22 assumes that a) both first and second set of bitfields are present and b) a Scell dormancy indication bitfield of the first length is not present. The first length is equal to the number of configured Scells for the wireless device 22 that are also configured with a dormant BWP.

Some Examples

Example A1. A network node 16 configured to communicate with a wireless device 22, the network node 16 configured to, and/or comprising a radio interface 62 and/or comprising processing circuitry 68 configured to:
transmit open systems interconnection (OSI) layer 1 signaling to indicate a transition of at least one secondary cell, Scell, one of to and from a dormant state.

Example A2. The network node 16 of Example A1, wherein the layer 1 signaling includes at least one bitfield in a downlink control information in a physical downlink control channel, PDCCH.

Example A3. The network node 16 of Example A1, wherein the layer 1 signaling switches the at least one Scell to a dormant bandwidth part, BWP.

Example B1. A method implemented in a network node 16, the method comprising transmitting open systems interconnection (OSI) layer 1 signaling to indicate a transition of at least one secondary cell, Scell, one of to and from a dormant state.

Example B2. The method of Example B1, wherein the layer 1 signaling includes at least one bitfield in a downlink control information in a physical downlink control channel, PDCCH.

Example B3. The method of Example B1, wherein the layer 1 signaling switches the at least one Scell to a dormant bandwidth part, BWP.

Example C1. A wireless device 22 configured to communicate with a network node 16, the WD 22 configured to, and/or comprising a radio interface 82 and/or processing circuitry 84 configured to:
receive open systems interconnection (OSI) layer 1 signaling to indicate a transition of at least one secondary cell, Scell, one of to and from a dormant state; and
optionally perform at least one action based at least in part on the layer 1 signaling.

Example C2. The wireless device 22 of Example C1, wherein the radio interface 82 and/or processing circuitry 84 is further configured to interpret the layer 1 signaling based at least in part on whether at least one dormant bandwidth part, BWP, is configured for the at least one Scell.

Example C3. The wireless device 22 of Example C2, wherein if the dormant BWP is configured for the at least one Scell, the layer 1 signaling is interpreted to include a first set of bit fields in downlink control information, DCI; and if the dormant BWP is not configured for the at least one Scell, the layer 1 signaling is interpreted to include a second set of bit fields different from the first set of bit fields in the DCI.

Example D1. A method implemented in a wireless device 22, the method comprising:
receiving open systems interconnection (OSI) layer 1 signaling to indicate a transition of at least one secondary cell, Scell, one of to and from a dormant state; and
optionally performing at least one action based at least in part on the layer 1 signaling.

Example D2. The method of Example D1, wherein the radio interface 82 and/or processing circuitry 84 is further configured to interpret the layer 1 signaling based at least in part on whether at least one dormant bandwidth part, BWP, is configured for the at least one Scell.

Example D3. The method of Example D1, wherein if the dormant BWP is configured for the at least one Scell, the layer 1 signaling is interpreted to include a first set of bit fields in downlink control information, DCI; and
if the dormant BWP is not configured for the at least one Scell, the layer 1 signaling is interpreted to include a second set of bit fields different from the first set of bit fields in the DCI.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| BWP | Bandwidth part |
| CDM | Code Division Multiplex |
| CQI | Channel Quality Information |
| CRC | Cyclic Redundancy Check |
| CSI-RS | Channel State Information Reference Signal |
| DC | Dual-connectivity |
| DCI | Downlink Control Information |
| DFT | Discrete Fourier Transform |
| DM-RS | Demodulation Reference Signal |
| FDM | Frequency Division Multiplex |
| EIRP | Effective Isotropic Radiated Power |
| HARQ | Hybrid Automatic Repeat Request |
| OFDM | Orthogonal Frequency Division Multiplex |
| PAPR | Peak to Average Power Ratio |
| PBCH | Primary Broadcast Channel |
| PRACH | Physical Random Access Channel |
| PRB | Physical Resource Block |
| PUCCH | Physical Uplink Control Channel |
| PUSCH | Physical Uplink Shared Channel |
| RRC | Radio Resource Control |
| SRS | Sounding Reference Signal |
| SS-block | Synchronization Signal Block |
| UCI | Uplink Control Information |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for a wireless device that is configured to communicate with a network node, the method comprising:
   receiving downlink control information, DCI, from a primary cell, Pcell; and
   determining that a first bitfield in the DCI is set to a specific value, and when the first bitfield in the DCI is set to the specific value:
      determining that at least one second bitfield in the DCI is used to indicate a secondary cell, Scell, dormancy; and
      causing the wireless device to transition the Scell from one of to and from a dormant state based on the at least one second bitfield.

2. The method of claim 1, wherein the at least one second bitfield in the DCI is one of:
   set to a first value to indicate to transition to the dormant state; and
   set to a second value to indicate to transition from the dormant state, the first value being different from the second value.

3. The method of claim 1, wherein determining that the first bitfield in the DCI is set to a specific value is based at least in part on the first bitfield in the DCI being set to one of:

a first value for a type 1 resource allocation; and
a second value for a type 0 resource allocation.

4. The method of claim 3, further comprising interpreting the at least one second bitfield in the DCI based at least on a value indicated by the first bitfield in the DCI.

5. The method of claim 3, wherein the first bitfield in the DCI is a frequency domain resource allocation, FDRA, field.

6. The method of claim 1, wherein the at least one second bitfield in the DCI includes at least one of a modulation and coding scheme bitfield, a new data indicator bitfield, a redundancy version bitfield, Hybrid Automatic Repeat Request, HARQ, process number bitfield, antenna port bitfield and demodulation reference signal, DMRS, sequence initialization bitfield.

7. The method of claim 1, further comprising determining that the DCI does not schedule a physical downlink shared channel, PDSCH, for the wireless device.

8. The method of claim 1, wherein the transition of one of to and from a dormant state corresponds to one of:
a transition from a non-dormant bandwidth part, BWP, to a dormant BWP; and
a transition from the dormant BWP to the non-dormant BWP.

9. The method of claim 8, wherein a dormant BWP corresponds to a BWP, on the activated Scell, on which physical downlink control channel, PDCCH, monitoring is not performed by the wireless device.

10. The method of claim 1, wherein the Scell dormancy indication indicates a plurality of configured Scell groups, each bit in the Scell dormancy indication corresponding to a respective Scell group of the plurality of configured Scell groups.

11. A method for a network node that is configured to communicate with a wireless device, the method comprising:
transmitting, via a primary cell, Pcell, downlink control information, DCI, including:
a first bitfield in the DCI set to a specific value; and
at least one second bitfield used to indicate a secondary cell, Scell, dormancy, the at least one bitfield configured to at least in part cause the wireless device to transition the Scell from one of to and from a dormant state.

12. The method claim 11, further comprising setting the at least one second bitfield in the DCI to one of:
a first value to indicate to transition to the dormant state; and
a second value to indicate to transition from the dormant state, the first value being different from the second value.

13. The method of claim 11, wherein the first bitfield in the DCI is set to:
a first value for a type 1 resource allocation; and
a second value for a type 0 resource allocation.

14. The method of claim 13, wherein the at least one second bitfield in the DCI is configured to be interpreted based at least on a value indicated by the first bitfield in the DCI.

15. The method of claim 11, wherein the at least one second bitfield in the DCI includes at least one of a modulation and coding scheme bitfield, a new data indicator bitfield, a redundancy version bitfield, Hybrid Automatic Repeat Request, HARQ, process number bitfield, antenna port bitfield and demodulation reference signal, DMRS, sequence initialization bitfield.

16. The method of claim 11, wherein the DCI does not schedule a physical downlink shared channel, PDSCH, for the wireless device.

17. The method of claim 11, wherein the transition of one of to and from the dormant state corresponds to one of:
a transition from a non-dormant bandwidth part, BWP, to a dormant BWP; and
a transition from the dormant BWP to the non-dormant BWP.

18. The method of claim 17, wherein a dormant BWP corresponds to a BWP, on the activated Scell, on which physical downlink control channel, PDCCH, monitoring is not performed by the wireless device.

19. The method of claim 11, wherein the Scell dormancy indication indicates a plurality of configured Scell groups, each bit in the Scell dormancy indication corresponding to a respective Scell group of the plurality of configured Scell groups.

20. A wireless device configured to communicate with a network node, the wireless device comprising:
processing circuitry configured to:
receive downlink control information, DCI, from a primary cell, Pcell; and
determine that a first bitfield in the DCI is set to a specific value, and when the first bitfield in the DCI is set to the specific value:
determine that at least one second bitfield in the DCI is used to indicate a secondary cell Scell, dormancy; and
cause the wireless device to transition the Scell from one of to and from a dormant state based on the at least one second bitfield.

* * * * *